W. E. SUMPNER.
PHASE ADJUSTMENT.
APPLICATION FILED DEC. 4, 1907.
940,747.
Patented Nov. 23, 1909.
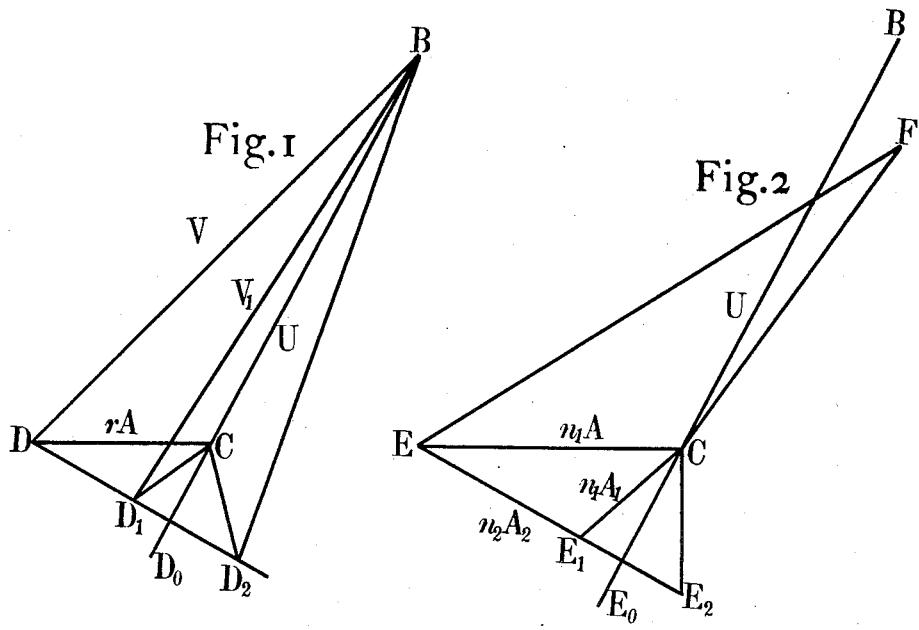
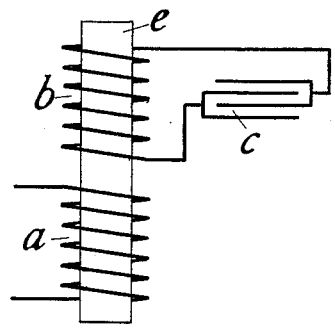
Fig. 3
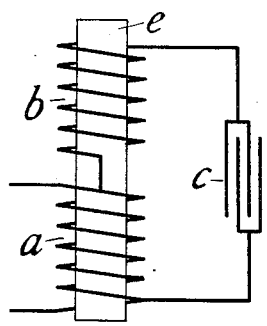
Fig. 4
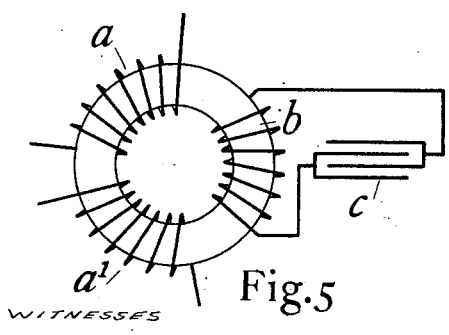
Fig. 5
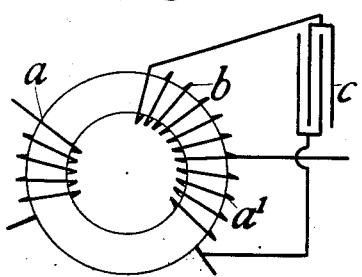
Fig. 6

UNITED STATES PATENT OFFICE.

WILLIAM EDWARD SUMPNER, OF MOSELEY, NEAR BIRMINGHAM, ENGLAND.

PHASE ADJUSTMENT.

940,747.          Specification of Letters Patent.     Patented Nov. 23, 1909.

Application filed December 4, 1907.   Serial No. 405,007.

*To all whom it may concern:*

Be it known that I, WILLIAM EDWARD SUMPNER, a subject of Great Britain, residing at Ainsdale, Cotton Lane, Moseley, near Birmingham, England, have invented new and useful Improvements in Phase Adjustment, of which the following is a specification.

In the normal working of alternating current instruments *e. g.* wattmeters, and in transformers and other apparatus employed therewith, small phase differences often occur tending to cause errors in the instrument readings. Such phase differences are introduced by inductive action of the instrument or transformer coils. Thus the self-induction of the moving coil circuit in the instruments described in my Patent No. 863,008, gives rise to a small phase error as does also the ratio of resistance to impedance of the stationary electromagnet. For many purposes the phase error in these instruments is negligible. But where great accuracy is required, and when the instruments are employed on circuits of low power factor it is desirable to correct the slight phase differences which occur.

The object of the present invention is to provide simple and effective means for compensating or eliminating the phase differences or errors arising in instruments or apparatus as aforesaid. For the purpose of this specification "phase error" is understood to mean the error introduced by difference of phase between the impressed and the induced voltages (or ampere turns).

Referring to the accompanying sheet of explanatory drawings:—Figures 1 and 2 are vector diagrams illustrating the principle of my invention. Figs. 3 and 4 show diagrammatically the application of the invention to electromagnets and Figs. 5 and 6 the application to transformers.

In order that the nature of the correction to be made may be clearly understood I will describe the vector diagram (Fig. 1) for an electromagnet. The side DB represents the impressed voltage (V), DC the product of resistance into current ($rA$) and CB the back or opposing voltage (U). The phase difference or error to be eliminated is denoted by the angle DBC. Usually the side DC is very small as compared with CB and in consequence the angle DBC may be neglected. Where, however, extreme accuracy is required the said angle must be reduced to zero, but with ordinary means this is impossible since the resistance ($r$) of the winding and in consequence the line DC will always have a measurable value.

To produce the degree of magnetization corresponding to a back or opposite voltage (U), the number of ampere turns needed is fixed by the physical properties of the magnet, and is equal to $n_1 A$ where $n_1$ is the number of turns in the magnetizing coil, and A is a certain current value. Now the value of $n_1$ is fixed by that of U, but if the core is wound with more than one coil, the current $A_1$ traversing the primary winding of $n_1$ turns is not necessarily the same as A for the required back voltage U, since if there is placed upon the core an auxiliary or secondary coil of $n_2$ turns through which passes from any source whatever a current having a particular value $A_2$ then, with a current $A_1$ in the primary winding, the back voltage will still be U provided that $$n_1 A_1 + n_2 A_2 = n_1 A.$$

This relation is represented vectorially by the triangle $ECE_1$ in Fig. 2 where—

EC is proportional to $n_1 A$.
$EE_1$ is proportional to $n_2 A_2$.
$E_1 C$ is proportional to $n_1 A_1$.

Since $n_1 A$ is parallel and proportional to $rA$, vectors $DD_1$ and $D_1 C$ respectively parallel to $EE_1$ and $E_1 C$ may be drawn as in Fig. 1. The impressed voltage $V_1$ required in the primary coil to produce the current $A_1$ is then denoted by the line $D_1 B$. To eliminate the angle DBC means are required for producing suitable values for $DD_1$ and $D_1 C$ so that the line DB can be shifted to $D_1 B$, and the angle DBC reduced to $D_1 BC$. The value of $D_1 C$, which is $rA_1$ cannot be made zero because the primary coil must have some resistance, and $A_1$ cannot be reduced to zero because it supplies the power needed to energize the core. But by suitably adjusting $A_2$ the point $D_1$ can be made to approach, and to even cross the line CB so that the phase angle between the impressed voltage and the back voltage may be reduced from DBC to a smaller value as $D_1 BC$, or to zero as $D_0 BC$, or to a negative value as $D_2 BC$, and so that the instrument error due to this phase angle may be similarly adjusted.

I have discovered that a current of the kind required in the secondary or auxiliary coil can be most conveniently obtained by means of a condenser attached to the terminals of the coil. Since the current taken by a condenser so connected is always practically in quadrature with the voltage induced by the core in the windings of the coil, the line $DD_1$ must be drawn at right angles to the line of opposing voltage BC. By varying either the capacity of the condenser or the turns in the secondary coil, $V_1$ may be made to either lag or lead with respect to U. In the former case $D_1$ lies between D and $D_0$ and in the latter case lies beyond $D_0$ for example at $D_2$. To make $V_1$ coincide in phase with U, $n_2 A_2$ must have a value represented by $EE_0$ or $DD_0$. As in practice the lines $DD_0$ and DC are approximately equal it follows that for exact compensation the condenser ampere turns must be approximately equal to the ampere turns needed to produce the required magnetization.

The invention therefore comprises the employment in conjunction with an electromagnet or transformer of an auxiliary winding and a condenser to which the said winding is connected. It has previously been proposed to employ auxiliary windings and condensers for neutralizing induction in alternating current systems, but this, as above stated, is not the purpose of the present invention. Apparatus operating in accordance with this invention does not suppress or neutralize the induction effects (viz:—induced voltages or ampere turns), but brings the impressed voltages or ampere turns into phase with them.

In one convenient application of my invention to the stationary electromagnet of instruments as described in my prior specification hereinbefore referred to, I provide an auxiliary winding consisting of a suitable number of turns around the electromagnet coil, and connect the ends of the said winding to the opposite plates of an ordinary condenser of suitable capacity, the number of turns of the winding and the condenser capacity being in general such as to give the relation aforesaid, namely the ampere turns associated with the condenser winding are approximately equal to those needed to magnetize the core to the degree corresponding with the primary voltage. In other words the impedance of the auxiliary winding is equal to that of the condenser. But the condenser and winding may be adjusted to suit special circumstances of the apparatus. In some cases the phase error corresponding with the angle DBC is not the only one to be compensated, and in order to neutralize all the phase errors arising in the action of the instrument, or of apparatus used in conjunction with it, the capacity of the condenser required may correspond not with $DD_0$ but with some value such as $DD_1$ or $DD_2$ appropriate to the actual working conditions. The arrangement of the condenser circuit is shown diagrammatically at Fig. 3 where $a$ is the primary coil and $b$ the auxiliary or secondary winding which is connected to a condenser $c$. For clearness the coils are shown separate but in practice they would ordinarily be superposed on the core $e$. In the diagram the core is shown as a straight bar, but it will be understood that in practice a shape suitable for measuring instruments is adopted, the poles being appropriately arranged to accommodate between them the moving coil. By this means the magnetization in the core can be brought into the required relation with the impressed voltage of the ordinary coil, and the phase error arising in the normal working of the instrument coils therefore readily corrected for a certain fixed frequency. If it is required to use the instrument or apparatus upon circuits of different frequencies a condenser of variable capacity may be employed, or the condenser may be connected to different points of the auxiliary winding. For current and voltage transformers the auxiliary winding consists of a tertiary winding $b$ with condenser $c$ arranged around the magnetic circuit of the usual primary winding $a$ and secondary winding $a'$ as shown diagrammatically at Fig. 5. The auxiliary or condenser winding is in all cases preferably quite distinct from the instrument or transformer coils, although in some cases it may be convenient to utilize some of the turns of the latter coils to form part of the condenser circuit. An example of this applied to an electromagnet is shown at Fig. 4 where $a$ is the primary coil $b$ the auxiliary coil and $c$ the condenser, the latter being connected to both $a$ and $b$. Fig. 6 shows the like application to a transformer.

An essential feature of my invention when applied to electromagnets excited in shunt to the mains and also when applied to voltage transformers, is that the condenser or auxiliary winding must include turns which are not traversed by any current except that through the condenser. What is needed is to so alter the magnitude and phase of the current through the primary coil that the angle DBC in Fig. 1 is made less. To secure this the above condition is necessary, for to merely shunt the condenser to the primary winding, or to part of it, would produce no improvement.

When my invention is applied to current transformers it is not essential for the auxiliary or condenser winding to include turns which are only traversed by the current through the condenser. A portion of one of the ordinary windings may be utilized as the auxiliary winding. In most cases, however, it will be necessary for the condenser winding to contain a larger number of turns than either of the ordinary windings, and in general it will be more convenient to arrange the coils separately. The application of the invention to current transformers is also represented by Fig. 2 in which EC represent as before the ampere turns needed to produce the back voltage U due to the core, and EF and CF denote respectively the primary and secondary ampere turns when condenser is not used. The value of U is determined by that of EC while the secondary ampere turns CF are determined by U together with the resistance and reactance of the secondary circuit. What is needed is to reduce the angle at F between the vectors denoting the primary and secondary ampere turns.

By using a condenser in the manner described so as to produce in the auxiliary winding the ampere turns denoted by $EE_1$ the primary ampere turns are altered from EF to $E_1 F$ and the angle at F can be reduced as desired. A further great advantage is that the capacity required for compensation is independent of the electrical properties of the secondary circuit, and is therefore independent of variation in these properties, since the condenser ampere turns $EE_1$ automatically adjust themselves to the voltage U needed to produce the required current in the secondary circuit. In practice the most serious error occurring in the operation of current transformers in conjunction with instruments, arises from the variable nature of the secondary circuit when including several instruments, tripping coils, relays etc.

By the employment of an auxiliary winding and condenser in conjunction with measuring instruments I am not only enabled to eliminate inaccuracies caused by phase differences, but also to increase the sensitiveness of the instruments by strengthening the electromagnets and increasing the number of turns of the moving coil circuit, since the error which would ordinarily be introduced thereby can now be readily neutralized. A further advantage arises in the construction of electromagnets and transformers inasmuch as the size and weight of the material employed can be considerably reduced, the necessity for making the phase error as small as possible, in order to minimize instrument error, being no longer existent owing to the possibility of compensation as above set forth.

In the application of my invention I do not limit myself to the uses hereinbefore described as it may be adapted to a variety of purposes in which phase variation is required to be obviated.

Having thus described my invention what I claim as new and desire to secure by Letters Patent is—

1. In means for correcting phase errors in electro-magnets and transformers used with alternating current measuring instruments, the combination with a core and an ordinary winding, of an auxiliary winding having the same magnetic circuit as the ordinary winding and a condenser connected in the circuit of the auxiliary winding, the capacity of the condenser and number of coils of the auxiliary winding being such that the ampere turns associated therewith correspond substantially to the total amount of magnetization required in the core.

2. In means for correcting phase errors in electro-magnets and transformers used with alternating current measuring instruments, the combination with a core and an ordinary winding, of an auxiliary winding having the same magnetic circuit as the ordinary winding and a condenser connected in the circuit of the auxiliary winding, the capacity of the condenser and number of coils of the auxiliary winding being such that the impedance of the auxiliary winding is substantially equal to that of the condenser.

3. In means for correcting phase errors in transformers used with alternating current measuring instruments, the combination with a core and ordinary primary and secondary windings, of an auxiliary winding having the same magnetic circuit as the ordinary windings and a condenser connected in the circuit of the auxiliary winding, the capacity of the said condenser and number of coils of the auxiliary winding being such that the ampere turns associated therewith correspond substantially to the total amount of magnetization required in the core.

4. In means for correcting phase errors in transformers used with alternating current measuring instruments, the combination with a core and ordinary primary and secondary windings, of an auxiliary winding having the same magnetic circuit as the ordinary windings and a condenser connected in the circuit of the auxiliary winding, the capacity of the said condenser and number of coils of the auxiliary winding being such that the impedance of the auxiliary winding is substantially equal to that of the condenser.

In testimony whereof I have signed my name to this specification in the presence of two subscribing witnesses.

WILLIAM EDWARD SUMPNER.

Witnesses:
JOHN MORGAN,
HARRY DAVIS.